TELEVISION SCANNING SYSTEM

Filed Nov. 9, 1950 2 Sheets-Sheet 1

INVENTOR
George C. Sziklai
BY Lie C. Mitchell
ATTORNEY

April 20, 1954 G. C. SZIKLAI 2,676,200
TELEVISION SCANNING SYSTEM
Filed Nov. 9, 1950 2 Sheets-Sheet 2

INVENTOR
George C. Sziklai
BY [signature]
ATTORNEY

Patented Apr. 20, 1954 2,676,200

UNITED STATES PATENT OFFICE 2,676,200

TELEVISION SCANNING SYSTEM

George C. Sziklai, Princeton, N. J., assignor to Radio Corporation of America, a corporation of Delaware Application November 9, 1950, Serial No. 194,795

10 Claims. (Cl. 178—5.4)

This invention relates to the art of television and particularly to television scanning systems.

In accordance with the present standards for black and white television, each picture frame consists of 525 horizontal lines. In operation, however, the vertical resolution of the pictures is comparable to only about 70% of the theoretical resolution which might be expected. After deducting blanking time, the practically realizable resolution, according to the present standards is approximately equivalent to 335 horizontal lines. This is the well-known Kell effect. A paper on this subject was published in the Proceedings of the I. R. E. of November 1945. This paper is titled "An Experimental Television System—The Transmitter" by R. D. Kell, A. V. Bedford and M. A. Trainor. Accordingly, full advantage of the 525 lines is not realized.

The horizontal resolution of the television image may be materially improved by the utilization of the dot interlacing principle proposed for color television. One such color system forms the subject matter of a copending U. S. application of R. C. Ballard, Ser. No. 117,528 filed September 24, 1949 and titled "Systems of Color Television." The dot interlace principle in accordance with the Ballard case is primarily for use in color television systems. The image is formed by a multiplicity of dots in the component image colors. The dots are displayed upon the screen in a certain sequence. However, in successive fields, the dots of any one color are interlaced horizontally, thereby materially improving the horizontal resolution of the image. It is desirable, therefore, to provide a system for increasing the vertical resolution of the reproduced image so that a greater utilization may be made of the 525 horizontal lines of the scanned raster.

It is an object of the present invention, therefore, to provide an improved scanning system for television by which to increase the vertical resolution of the reproduced image.

Another object of the invention is to provide an improved scanning system for television by which to increase vertical resolution without increasing the frequency bandwidth of the signal transmission channel from the transmitter to the receiver.

A further object of the invention is to provide an improved scanning system for television by which to increase the vertical resolution of the reproduced image and which is compatible with present black and white standards.

According to the present invention, the horizontal scanning is effected in undulating scanning traces instead of the conventional linear traces. The horizontal scanning, in general, is of a type disclosed in U. S. Patent 2,222,934, granted November 26, 1949 to A. D. Blumlein and titled "Television Transmitting and Receiving System." In the Blumlein system, the undulating traces of all of the horizontal lines of the raster are in phase with one another. The present invention provides for a 180° phase shift in the undulating traces of successive fields. In this way, the horizontal resolution of the reproduced image is fully equal to that produced by the conventional straight line scanning. The 180° phase shift of the undulating traces of successive fields is produced in a system operating in accordance with the present standards by employing a frequency for the undulations, which may be a sinusoidal oscillation, that is an odd multiple of one-half of the horizontal scanning frequency.

The novel features that are considered characteristic of this invention, are set forth with particularity in the appended claims. The invention, itself, however, both as to its organization and method of operation, as well as additional objects and advantages thereof, will best be understood from the following description when read in connection with the accompanying drawings.

Figure 1:
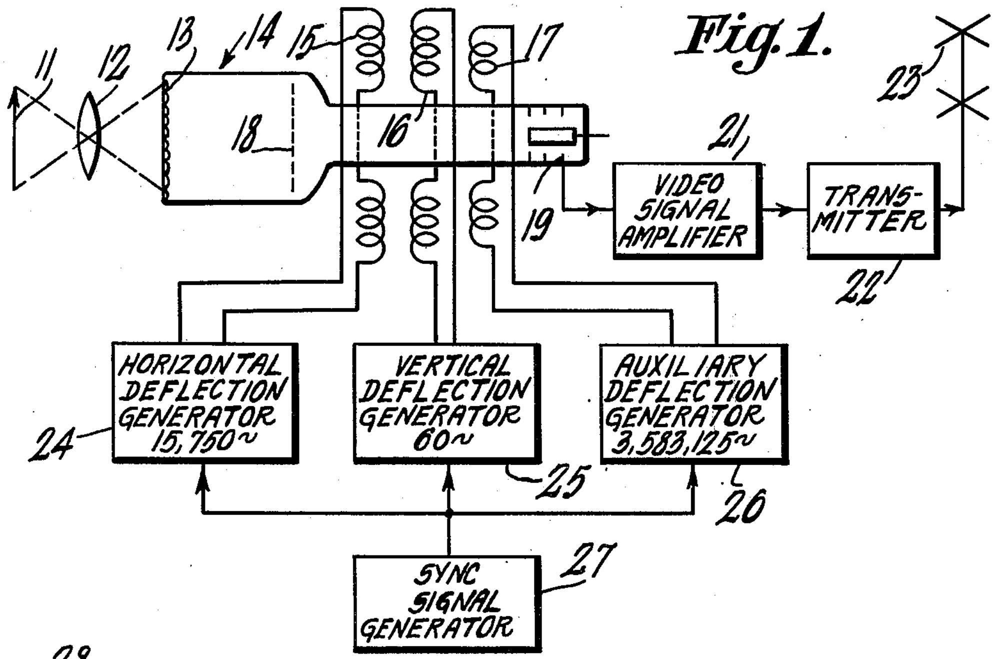
Figure 1 is a block diagram of television transmitting apparatus embodying the present invention.

Reference first will be made to Figure 1. Light from an object 11 is projected by an optical system 12 onto the photosensitive cathode 13 of a television camera tube 14. The camera tube, as illustratively disclosed herein, may be an image orthicon. It will be clear to those skilled in the art that other types of camera tubes may be employed in the practice of this invention with substantially equal facility.

The camera tube is provided with the usual deflection system which includes horizontal and vertical deflection coils 15 and 16, respectively. In addition, the tube is provided with an auxiliary deflection coil 17 which is effective to produce a vertical oscillation of the electron beam which is used to scan the target electrode 18.

Video signals are derived from the output electrode 19 of the camera tube 14 and are impressed upon a video signal amplifier 21. The amplified video signals derived from the amplifier 21 are impressed upon a transmitter 22, the output of which is connected to excite a radiating antenna 23. It will be understood that the transmitter 22 may be conventional and includes apparatus for mixing the video signals with the synchronizing signals and for modulating a carrier wave for radiation.

The transmitting apparatus also includes a horizontal deflection generator 24 which is coupled to the horizontal deflection coil 15 for excitation thereof. Similarly, a vertical deflection generator 25 is provided and is coupled to excite the vertical deflection coil 16. Further in accordance with the present invention, there is provided an auxiliary deflection generator 26 which is coupled to the auxiliary deflecting coil 17.

The deflection generators 24, 25 and 26 are controlled by a synchronizing signal generator 27 so that the waves developed by the respective deflection generators are maintained in proper relationship to one another. Also, the synchronizing signal generator 27 is coupled to the transmitter 22 to supply the synchronizing signals for combination with the video signals to form a composite television system in the usual manner.

The general operation of the transmitting apparatus of Figure 1 will be described briefly before considering the receiving apparatus and presenting a more detailed description of the over-all operation of the system in accordance with this invention. For the purpose of concreteness rather than restriction, the operation of the apparatus will be described with reference to certain deflection frequencies. The horizontal deflection generator 24, for example, will be assumed to develop a substantially saw-tooth wave at a frequency of 15,750 cycles per second. Similarly, the vertical deflection generator 25 will be assumed to develop another saw-tooth wave having a frequency of 60 cycles per second. These frequencies are, in accordance with the present standards, those at which the line and field scanning operations are effected. Also, it will be understood that the apparatus operates in accordance with the present established standards for black and white television, whereby 30 complete frames of a 525 line picture are scanned per second. Each frame consists of two fields of interlaced horizontal lines.

In accordance with the present invention the auxiliary deflection generator 26 will be assumed to develop a substantially sinusoidal wave having a frequency of 3,583,125 cycles per second. It will be seen that this frequency is the 455th harmonic of one-half of the horizontal scanning frequency. It, therefore, satisfies the requirement in accordance with this invention that the auxiliary vertical deflection be effected at a frequency which is an odd multiple of one-half the horizontal scanning frequency. It will be understood that the frequency at which the auxiliary deflection generator 26 is assumed to operate is merely illustrative of the operation of this invention. Obviously, other frequencies may be employed without departing from the invention provided that they meet the requirements specified. The form of the auxiliary deflection wave need not be sinusoidal as assumed. Other wave shapes, such as rectangular or square ones, may beu sed within the scope of this invention.

Also, in accordance with this invention, the magnitude of the auxiliary deflection wave derived from the generator 26 should be such that the sinusoidal vertical deflection of the scanning beam has an amplitude which is substantially equal to one-half of the normal spacing between adjacent horizontal lines of the raster.

Before considering in any greater detail the operation of the system in accordance with this invention, reference will be made to Figure 2 for a description of the receiving apparatus. An antenna 28, of a kind to intercept the radiated carrier wave, is coupled to a receiver 29. It will be understood that the receiver may be entirely conventional, comprising the usual carrier wave-amplifying and signal-detecting apparatus. Accordingly, it will be understood that there may be derived from the receiver 29 the video signals which are impressed upon a video signal amplifier 31. Also, the receiver 29 may be coupled to a synchronizing signal separator 32 by which to recover the synchronizing signals from the received composite signal to the exclusion of the video signal component.

The video and synchronizing signals are employed to operate an image-reproducing device such as a cathode ray tube or kinescope 33. The video signals derived from the amplifier 31 are impressed upon an electrode of the electron gun, with which the kinescope 33 is provided, so as to modulate the intensity of the electron beam in accordance with the video signal information. The kinescope 33 also is provided with horizontal and vertical deflecting coils 34 and 35, respectively. In addition, in accordance with the present invention, the kinescope is provided with an auxiliary deflecting coil 36 by which to produce a high frequency vertical deflection of the electron beam.

The receiving apparatus also includes a horizontal deflection generator 37 adapted to produce a substantially saw-tooth wave at the horizontal scanning frequency of 15,570 cycles per second. The horizontal deflection generator is coupled to energize the horizontal deflecting coil 34. A vertical deflection generator 38 is adapted to generate a substantially saw-tooth wave at the field scanning frequency of 60 cycles per second and is coupled for energization of the vertical deflecting coil 35. Finally, an auxiliary deflection generator 39 capable of developing a substantially sinusoidal wave at a frequency of 3,583,125 cycles per second is provided for exciting the auxiliary deflecting coil 36. The deflection generators 37, 38 and 39 are coupled to the synchronizing signal separator 32 for control in the usual manner.

Figure 2:
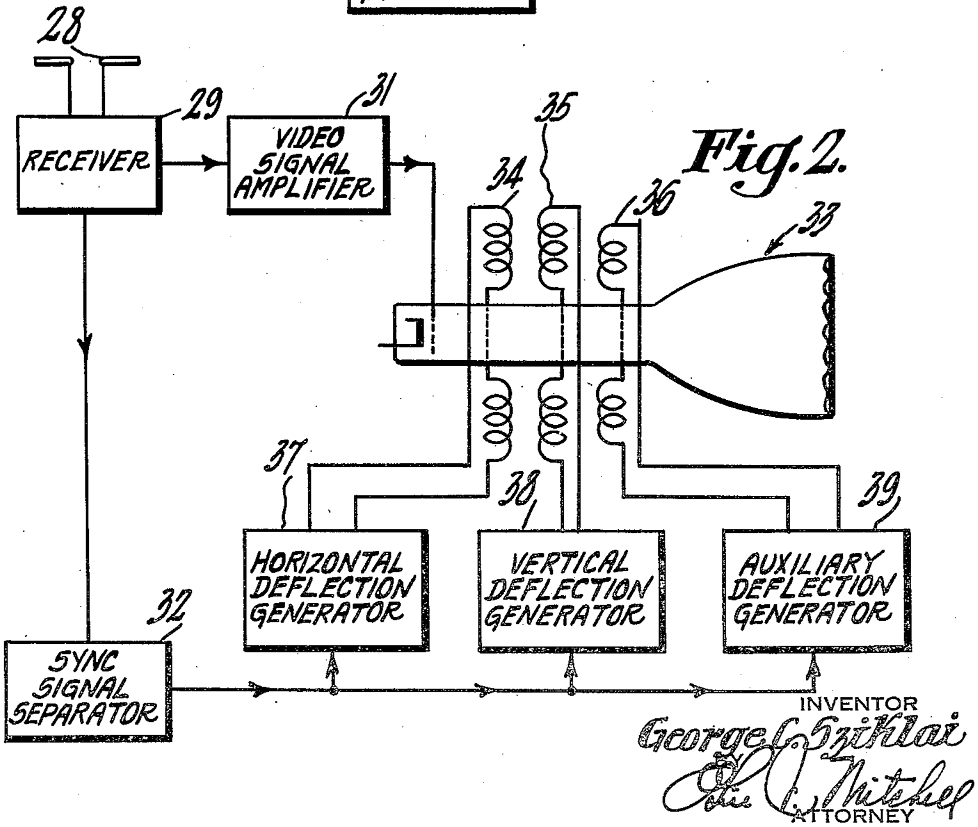
Figure 2 is a block diagram of television receiving apparatus embodying the invention.

The receiving apparatus of Figure 2 operates in a manner substantially similar to the previously described transmitting apparatus of Figure 1. Horizontal and vertical deflection of the video signal-modulated electron beam by the coils 34 and 35, respectively is conventionally effected. In addition, the horizontal traces made by the electron beam, in scanning the luminescent screen of the kinescope 33, have a sinusoidal form produced under the influence of the auxiliary deflecting coil 36. In this way, the scanning operations at the transmitter and at the receiver are made identical.

For a more detailed consideration of the manner in which the present invention operates to increase the vertical resolution of the television image, reference now will be made to Figure 3. This figure consists of sinusoidal curves 41 and 42 representing, respectively, the auxiliary vertical deflections of the scanning beams. These curves may also be considered to represent the two different types of traces made by the electron beams on the target electrode 18 and the luminescent screen 40, respectively, of the camera tube 14 and of the kinescope 33. The curve 41 represents the scanning pattern for each of the horizontal lines of the raster in fields 1, 4, 5, 8, etc. The curve 42 represents the scanning pattern for each of the horizontal lines of the raster in fields 2, 3, 6, 7, etc. It will be noted that the curves 41 and 42 are 180° out of phase with one another. It may be seen that, in each horizontal line of the raster, the sinsuoidal curves 41 and 42 have an odd number of half cycles.

In accordance with the presently assumed frequencies, each trace such as represented by the curves 41 and 42 includes 227.5 cycles per horizontal line. Consequently, after scanning an odd number of lines the curves 41 and 42 will have an odd number of half cycles. This has the effect that the sinsuoidal traces representing the horizontal lines of the raster will have completed an odd number of half cycles at the completion of scanning a raster of 525 lines, in accordance with the present standards. Therefore, in the second scansion of the first line of the raster, the horizontal trace will be 180° out of phase with the horizontal trace of the initial scansion of this line. It is clear that the sinusoidal scansion of all of the remaining lines of the raster also will be 180° out of phase with the first scansion of these lines.

By such a process, it will be seen that each elemental image of the area in effect is divided into upper and lower halves. This has the effect of increasing the vertical resolution of the image substantially by a factor of 2. It is true that, in such a situation, the repetition rate of each spot of the image is equal substantially to one-half of that produced by the more conventional straight line scanning. However, it must be taken into account that these spots or areas are very small, being of the order of magnitude of one-half of the conventionally sized areas in straight line scanning. Therefore, because of the increased degree of fineness of the image areas, the lower repetition rate produced in accordance with this invention will not produce objectionable flicker.

Figure 3:
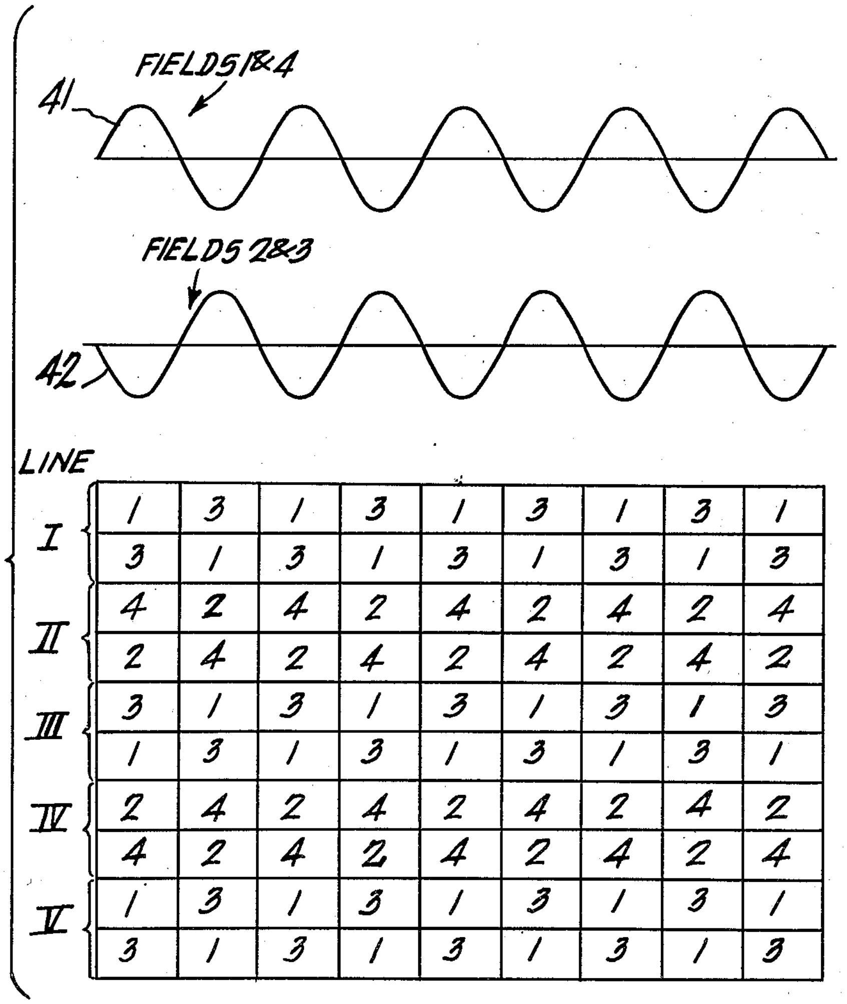
Figure 3 is a graphical representation of the manner in which the present invention operates to increase the vertical resolution of the picture; and, Figure 4 is a graphical illustration of the use of the invention in a color television system.

The chart portion of Figure 3 is intended to represent a raster of a television image separated into horizontal lines and elemental areas. The raster contains an odd number of horizontal lines which, as illustrated, is 5 in the present instance. By this means, an analogy comparable to an actual television raster of 525 lines may be made. Not only does the actual television raster contain an odd number of lines, but the number of lines is equal to 4 N+1. In the actual case, N is equal to 131. In the assumed case illustrated in Figure 3, N is equal to 1. It is not intended to imply that the present invention is applicable only to those television systems having rasters containing a number of lines equal to 4 N+1. On the contrary, it is equally applicable to any system having an odd number of scanning lines. The only difference between the system disclosed and any other system having an odd number of scanning lines is in the particular pattern in which the elemental areas of the complete image is scanned.

In the simulated raster of Figure 3, each of the five horizontal lines is assumed to contain nine elemental areas. Further, each of the elemental areas is assumed to be sub-divided into upper and lower portions. In accordance with this invention, the scanning of each of the elemental areas of the raster is effected by scanning only a half of each of the areas at a time. It will be noted that the horizontal arrangement of the raster areas is related to the sinusoidal curves 41 and 42 in such a way that each area is in alignment with a half cycle of the curves 41 and 42. Furthermore, for the purpose of this description, it will be assumed that the position of the half cycles of the curves 41 and 42 above or below the axis of the curves corresponds to the scanning of the upper or lower halves of the image areas.

The chart has numbers 1, 2, 3 and 4 in the upper and lower halves of each of the raster areas. These numbers correspond to the successive scanning fields. The numbers indicate those portions of the elemental area which are scanned during the different fields. Furthermore, it is assumed that the scanning of the raster is in accordance with the present standards and employs a two-to-one line interlace. Therefore, the odd numbered lines such as I, III and V are assumed to be scanned in succession in one field, while the even numbered lines such as II and IV are scanned in succession during the next field.

Without going through the complete chart in detail, starting with the upper half of the elemental area of line I, the scanning trace across this line is in accordance with the curve 41. Accordingly, the upper halves of the first, third, fifth, seventh and ninth elements are scanned during field 1. Also during field 1, the lower halves of the second, fourth, sixth and eighth areas are scanned. In each of these halves of the elemental areas of line I, the numeral 1 appears, indicating scansion of this period during field 1. It will be noted that the upper half of the ninth elemental area of line V is the last portion of the raster scanned during field 1. Therefore, the lower half of the first area of line II is the first portion of the raster scanned during field 2. The scanning pattern, in accordance with the present invention, is of such a character that the upper half of the ninth elemental area of line IV is the last portion of the raster scanned during field 2. At this point one-half of each elemental area of the entire raster has been scanned once.

The entire raster again is scanned in two interlaced fields in sinusoidal traces so that the other halves of the elemental areas also are scanned. Inasmuch as it was the upper half of the ninth element of line IV which was scanned during field 1, the first area to be scanned in field 3 is the lower half of the first area of line I. Now, it is seen that the sinusoidal scansion of line I is in accordance with the curve 42 and is 180° out of phase with the first scansion of this line. The same relationship exists for the scansion of the even-numbered lines during field 4 so that, at the completion of field 4, the entire area of the raster has been covered. Furthermore, it is seen that, at the completion of the scansion of field 4, the pattern is such that it will repeat in field 5 in the manner indicated for field 1.

The present invention is not necessarily limited for use in black and white television systems.

On the contrary, it may be used to considerable advantage in certain types of color television systems. One such system is that which operates in accordance with the dot or elemental multiplex principle. One form of such a color television system is covered in a copending U. S. application of John Evans, Serial No. 111,384 filed August 20, 1949 and titled "Color Television." In such a color television system a video signal wave has successive instantaneous amplitudes representative of the component color light intensities of different elemental areas of an image. This wave is sampled at a relatively high frequency to derive individual color-representative video signal pulses by which to reproduce the image.

It is in this type of system especially, that the horizontal dot interlacing technique, forming the subject matter of the Ballard application previously referred to, is particularly useful. According to the Ballard technique the signal sampling is effected at a frequency which is an odd multiple of one-half of the line scanning frequency. By this means alternate ones of the horizontal dots are produced in one scansion of each of the lines and the intermediate dots are produced in the next scansion of these lines.

The operation of a dot multiplex color television system may be further enhanced by the use of the present invention. The vertical dot interlacing, as produced by the operation of the present system, will have little or no effect upon those portions of the image in which high chroma colors are present. It will produce, however, beneficial results in a dot multiplex color television system in those areas of the picture which are black and white, different shades of gray and even low chroma colors.

Figure 4:
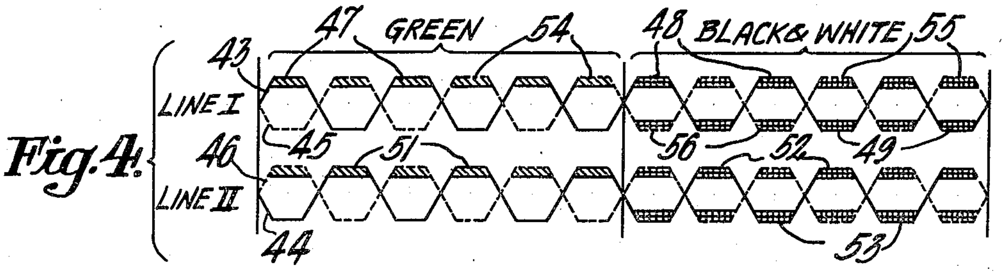

The manner in which this beneficial result is produced is illustrated graphically in Figure 4 to which reference now will be made. It is assumed that the image to be reproduced consists of a vertical green bar forming the left-hand portion thereof and a black and white or gray bar forming the right-hand portion. Only the first two lines of the raster are indicated for the reason that, in view of the foregoing description given in connection with Figure 3, it is believed that those skilled in the art will understand the manner in which the scanning system in accordance with this invention operates for succeeding lines of the raster. The traces made by the scanning beam during fields 1 and 2 are indicated by the solid lines such as 43 and 44 of raster lines I and II, respectively. In a similar manner, the traces made by the beam during fields 3 and 4 are indicated by the broken lines 45 and 46 of raster lines I and II, respectively. The shaded areas of this figure represent the luminous dots made on the screen of a kinescope, for example, during the scanning process in accordance with this invention. The intensity of the light produced on the screen by these dots is determined by the intensity modulation of the electron beam in the usual manner.

Consider first the left-hand or green portion of the image area during the scanning of field 1. During each positive half cycle of the trace 43, the intensity of the electron beam is modulated to produce visible light which is representative of the green area of the picture. During the negative half cycles of the trace 43, there is no intensity modulation of the electron beam to represent the green color information. Instead, in accordance with the dot multiplex principle as disclosed in the copending Evans application referred to, the other component colors, such as red and blue, of the image are displayed in the intervals between the green display. Accordingly, it is seen that, during the scansion of line I of the raster, during field 1, green-representative areas such as 47 are excited.

Also, during the scansion of line I during field 1 in the black and white portion of the picture area, the electron beam is modulated in intensity to represent the black and white or low chroma portion of the picture. In the case of a black and white representation, for example, it is seen that the screen is excited to produce light during all positive half cycles of the trace 43 to produce luminous areas such as 48. Now, however, because the intensity of the beam is modulated in accordance with the black and white picture information, all of the component image colors may be considered to be present in equal intensity since it is assumed that this color television system is of the additive type. Accordingly, the beam is modulated in accordance with the black and white information substantially continuously with the result that there are produced, during the negative half cycles of the trace 43, luminous areas such as 49.

As more fully described in connection with Figure 3 and with additional reference to the immediately foregoing description of Figure 4, it will be appreciated that, while raster line II is being scanned during field 2, the electron beam intensity is modulated to represent the green picture area. Accordingly, there are produced green luminous dots or elemental areas such as 51 during positive half cycles of the trace 44. In a similar manner, the black and white, or low chroma color portion of the picture is represented by the areas 52 and 53 produced during positive and negative half cycles respectively of the trace 44.

During the scansion of raster line I during field 3, the intensity modulation of the electron beam, as it follows the path represented by the trace 45 across the green portion of the picture, produces green luminous dots such as 54. It is noted that these green areas appear midway between the green areas such as 47 produced in the first scansion of this line. This is the result produced by the horizontal dot interlacing system as covered in the previously referred to copending Ballard application. Again, it is noted that no green areas are produced during the negative half cycles of the trace 45.

Further scansion of raster line I during field 3 produces black and white picture elemental areas such as 55 and 56. These areas are produced, respectively, during positive and negative half cycles of the trace 43. It is seen, in the right-hand portion of Figure 4, that the dot interlacing principle is employed to produce the same beneficial results as in the color portion of the picture. Furthermore, it may be seen that an effective vertical interlacing of the black and white picture dots is effected.

Without describing in detail the operation of the system during the scansion of raster line II in field 4, it will be understood that the results produced are similar to those described with reference to line I of the raster. Thus, it may be seen that the vertical resolution, in the high chroma color areas of a picture, is equal to the vertical resolution in present black and white television systems. By reason of the operation of the present invention, however, it may be seen that the vertical resolution in the low chroma color and/or black and white areas of a picture is substantially two times that of the present black and white systems.

It, therefore, may be seen from the foregoing description of an illustrative embodiment of the invention that there is provided an improved scanning system for television purposes by which the vertical resolution of the reproduced image may be substantially increased. Furthermore, it may be seen that this increase in vertical resolution may be secured without increasing the frequency bandwith requirements of the signal transmission channel. Moreover, the present system is entirely compatible with present black and white television systems. In order to realize the full benefit of the invention, it is necessary, of course, that the scanning system be employed both in the transmitter and in the receiver. Nevertheless, it is not necessary that every receiver be provided with a scanning system in accordance with the invention, even though the transmitter does operate in such a manner. A receiver in which linear scanning is effected will operate entirely satisfactorily without, however, the advantage of the additional benefits in vertical resolution to be derived from the use of the invention both at the transmitter and at the receiver.

The nature of the invention may be ascertained from the foregoing description of an illustrative embodiment thereof. The scope of the invention is set forth in the following claims.

What is claimed is:

1. A system for scanning a television raster comprising, means including a horizontal deflection system for effecting a horizontal scanning of said raster, means including a vertical deflection system for effecting a vertical scanning of said raster, said raster having an odd number of substantially horizontal lines appearing in a plurality of line-interlaced fields, means including an auxiliary vertical deflection system for effecting an undulating horizontal scanning of said raster, and means controlling said auxiliary deflection system to effect a 180° phase shift between successive scansions of the same line in different ones of said fields.

2. A television scanning system as defined in claim 1 wherein, said auxiliary deflection system controlling means is of a character to produce a wave having a frequency related to the frequency of said horizontal scanning in such a way that said 180° phase shift of successive scansions of the lines of said raster is automatically effected.

3. A television scanning system as defined in claim 1 wherein, said auxiliary deflection system controlling means is of a character to produce a wave having a relatively high frequency equal to an odd multiple of one-half the frequency of said horizontal scanning.

4. A television scanning system as defined in claim 1 wherein, said auxiliary deflection system controlling means is of a character to produce a wave by which to effect said undulating scanning in an amplitude equal substantially to one-half of the normal spacing between adjacent horizontal lines of said raster.

5. A television scanning system as defined in claim 1 wherein, said auxiliary deflection system controlling means is of a character to produce a wave by which to effect said undulating horizontal scanning in a substantially sinusoidal manner.

6. A television scanning system as defined in claim 1 wherein, said horizontal and vertical deflection systems are so related in frequency to one another that said raster consists of two interlaced fields and said raster is completely scanned in four of said fields.

7. A system for scanning a television raster comprising, means including a horizontal deflection system for effecting a horizontal scanning of said raster, means including a vertical deflection system for effecting a vertical scanning of said raster, said horizontal and vertical deflection systems producing a raster having an odd number of substantially horizontal lines appearing in a plurality of interlaced fields, means including an auxiliary vertical deflection system for effecting an undulating horizontal scanning of said raster, and means controlling said auxiliary deflection system so as to effect said undulating scanning at a relatively high frequency equal to an odd multiple of one-half of the frequency of said horizontal scanning.

8. In a color television system in which successive instantaneous amplitudes of a video signal wave represent the component color light intensities of different elemental areas of an image, means for deflecting an electron beam horizontally and vertically to scan a raster having an odd number of substantially horizontal lines appearing in a plurality of line-interlaced fields, means for sampling said video signal wave at a relatively high frequency equal to an odd multiple of one-half of said horizontal beam deflection frequency and means for effecting an auxiliary vertical deflection of said beam at a relatively high frequency equal to an odd multiple of one-half of said horizontal beam deflection frequency to produce undulating horizontal raster lines.

9. Color television apparatus as defined in claim 8 wherein, said video signal wave-sampling means for each of said component image colors and said auxiliary vertical beam deflection means operate at the same frequency.

10. Color television apparatus as defined in claim 8 wherein, said video signal wave represents a number of component image colors, and said video signal wave-sampling means for all of said component colors operates at a frequency which is equal to an odd multiple of said auxiliary vertical beam deflection frequency.

References Cited in the file of this patent

UNITED STATES PATENTS

| Number | Name | Date |
|---|---|---|
| 2,222,934 | Blumlein | Nov. 26, 1940 |
| 2,431,115 | Goldsmith | Nov. 18, 1947 |
| 2,508,267 | Kasperowicz | May 16, 1950 |